G. M. SAYBOLT.
VISCOSIMETER.
APPLICATION FILED FEB. 2, 1914.
1,132,621.
Patented Mar. 23, 1915.
2 SHEETS—SHEET 1.
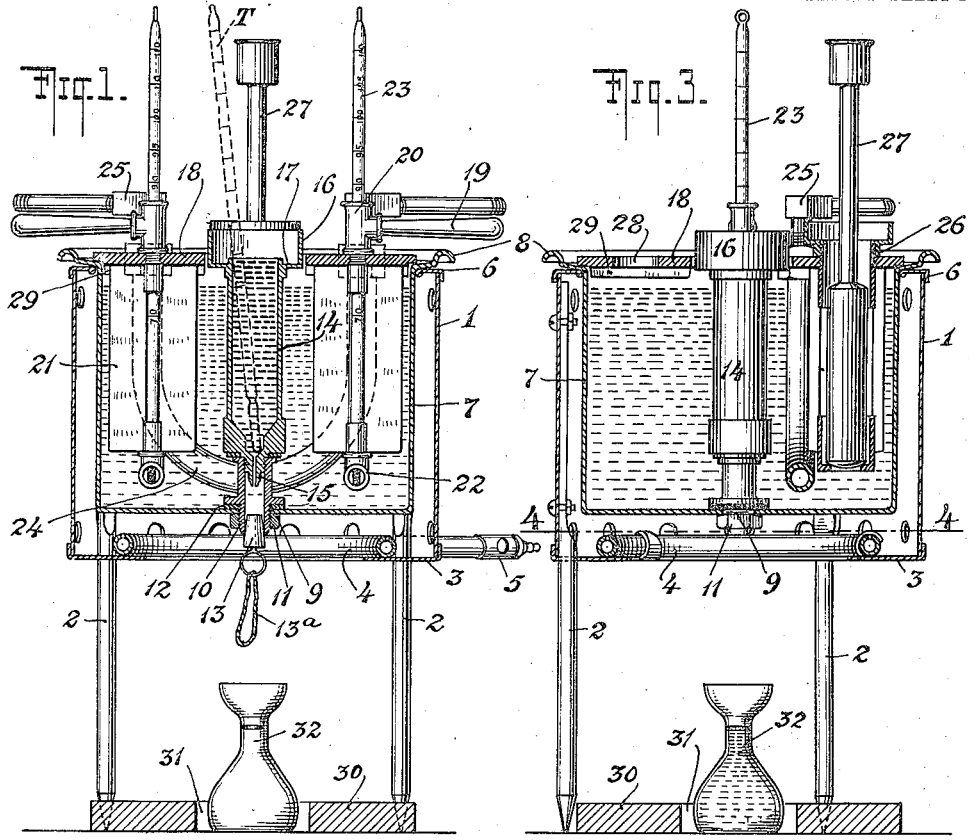
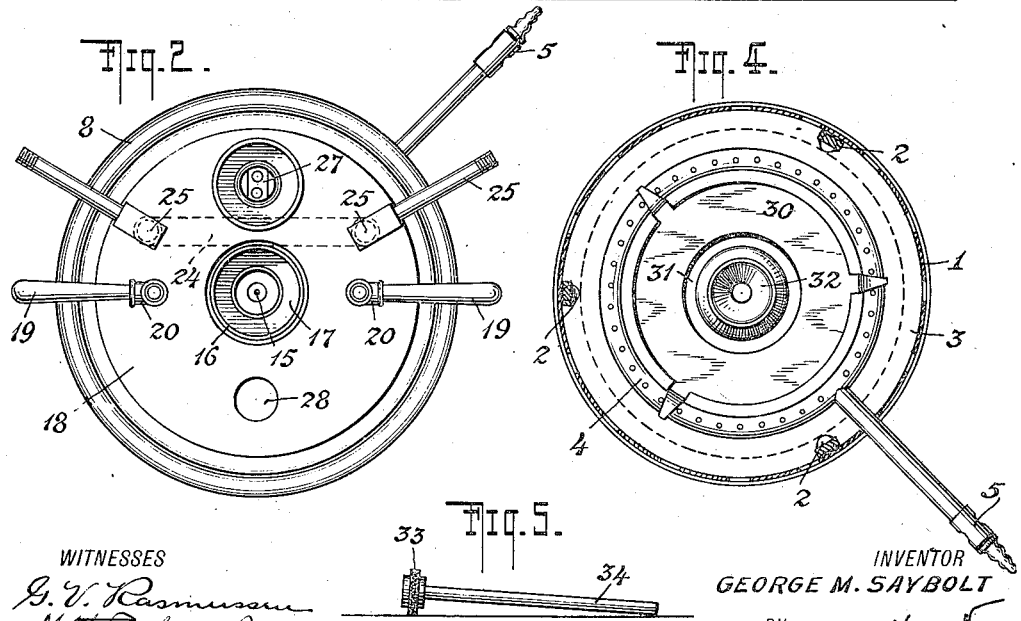
WITNESSES
G. V. Rasmussen
M. H. Lockwood
INVENTOR
GEORGE M. SAYBOLT
BY
ATTORNEYS

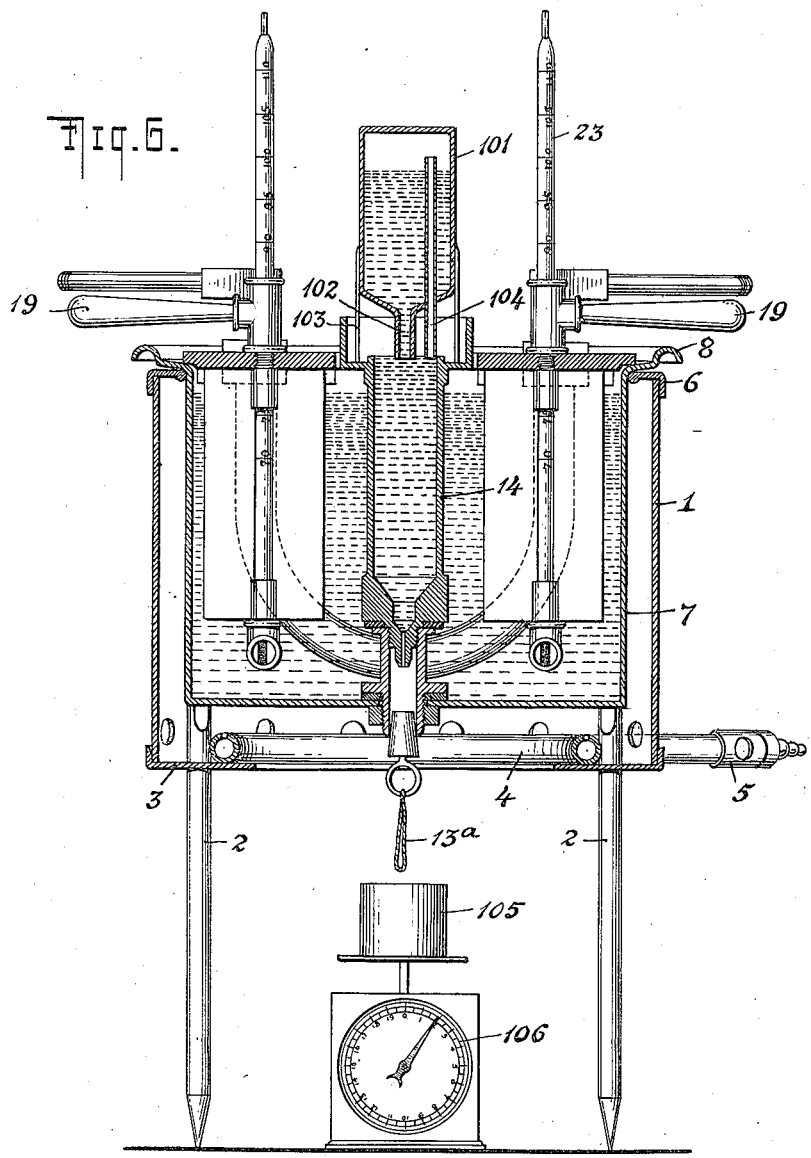

UNITED STATES PATENT OFFICE.

GEORGE M. SAYBOLT, OF JERSEY CITY, NEW JERSEY.

VISCOSIMETER.

1,132,621.  Specification of Letters Patent.  Patented Mar. 23, 1915.

Application filed February 2, 1914. Serial No. 815,918.

*To all whom it may concern:*

Be it known that I, GEORGE M. SAYBOLT, a citizen of the United States, and resident of Jersey City, county of Hudson, State of New Jersey, have invented a certain new and useful Improvement in Viscosimeters, of which the following is a specification.

My invention relates to an instrument adapted for determining the viscosity of liquids such as oils, or similar liquids, and is intended to facilitate the accurate determination and comparative viscosity of the various oils or liquids.

The object of my invention is to produce a simple device of this character in which the tube or receptacle for receiving the liquid whose viscosity it is desired to obtain, may be entirely surrounded by a bath fluid maintained at any desired constant temperature. The tube is of special construction and arranged so that it can readily be filled and the capacity of the tube is such that the same quantity of liquid can always be used in a test, the top of the tube being arranged to take care of any overflow thus maintaining the constant level or head for liquid to be tested. The bath surrounding the tube is protected and covered by a turn-table which is adapted to act as a support for heating appliances both electric and steam or water. The turn-table also is preferably provided with paddles which extend into the bath fluid and are adapted to agitate the fluid and thus distribute the heat so that the bath fluid shall be of uniform temperature throughout. Suitable tubes or other means are set in the turn-table cover for receiving thermometers adapted to give the temperature of the bath fluid, while wooden handles or other insulated devices are attached to the cover and extend laterally therefrom so as to oscillate the turn-table when desired, thus oscillating the paddles attached thereto for agitating the bath fluid and distributing the heat therein.

The several advantages and objects of my invention may be outlined as follows: The test sample tube is of a capacity much less than the surrounding bath so that the bath medium as well as the tube may be more readily brought to the temperature desired and maintained at such temperature during the test. The sample tube being of small diameter the area of the sample exposed to the air is very small and further the overflow enlargement arranged at the top of the tube automatically adjusts the starting head so that it is always the same for each sample tested. The simple and effective compressed air stopper at the bottom of the tube is adapted to effectually prevent flow of the liquid from the sample tube through the small orifice in the bottom thereof until the desired temperature is reached, and the stopper, not coming in contact with the end of the tube, cannot in any way affect the instrument or the flow prior to or during the test. Another advantage in the use of a small tube for the test liquid is that by reducing the capacity the time required for making the test is shortened. Another object is to provide an efficient means for satisfactorily cleaning out the tube after a test sample has been run through. A further object is to provide an efficient centering device for centering the receptacle in proper alinement under the nozzle of the sample tube.

My apparatus is provided with a gas burner in the base of the jacket and with a steam or hot (or cold) water pipe or coil extending from the turn-table cover into the fluid of the bath and is also provided with means for supporting an electric heater in the bath thus equipping the apparatus with facilities for heating or controlling the temperature of the bath with the greatest amount of ease and accuracy, since it will be understood that either one or all of these heating appliances may be used as desired or required. Furthermore while using any one or several of the heating appliances the turn-table cover with the paddles attached thereto may be oscillated more or less to agitate the fluid and distribute the heat so as to quickly and accurately bring the test sample to the proper temperature.

One form of my apparatus, adapted to carry out the above objects, is shown in the accompanying drawings of which—

Figure 1 is a vertical section across a diameter; Fig. 2 is a top plan view of the device; Fig. 3 is a section substantially at right angles to the section in Fig. 1 some of the parts being shown in full lines; Fig. 4 is a section at 4—4 of Fig. 3 looking toward the base; Fig. 5 shows the plunger which is adapted to clean out the sample tube when desired, and Fig. 6 represents a constant head apparatus.

Referring to the drawings 1 represents the jacket or casing of the instrument which is supported by tripod legs 2 attached thereto in any suitable manner. The jacket is provided with an annular base 3 to which is attached a ring burner 4 having an inlet tube 5 of the Bunsen or any preferred type. The upper end of the jacket is provided with an annular ring or flange 6 extending inward and adapted to support a bath vessel 7 and leave an annular space between the jacket and bath. The bath has an outwardly extending flange at 8 which overlaps the flange 6 of the jacket. The bath 7 is perforated at the center of its bottom at 9 and has inserted therein an upright concentrically arranged tube 10 secured in the opening in the bottom of the bath by a suitable nut 11, the joint between the two being made tight by packing as at 12. The lower end of this tube 10 is adapted to receive a cork 13, which will effectually seal the lower end of the tube air tight. The upper end of the tube 10 has resting on it and secured thereto the lower end of the test sample tube 14 which is provided with a nozzle 15 having a fine bore, the nozzle extending into the upper end of the tube 10, but not being long enough to come into contact with the cork 13 placed in the end of the tube. (See Fig. 1.) This arrangement forms an efficient air stopper for the lower end of the sample tube so that the liquid being tested cannot flow until the cork 13 is withdrawn, being sustained by compressing the air in the chamber surrounding the nozzle. A cord 13$^a$ is preferably attached to the cork 13 for quickly withdrawing the same. The upper end of the tube 14 is provided with an enlargement 16 concentric with the tube and provided with an annular depression or groove 17 surrounding the mouth of the tube so that in filling the tube or when inserting a thermometer to take the temperature of the sample any overflow will pass into the enlarged section and when the thermometer is withdrawn the tube will be filled from the overflow and the surplus by siphoning or other suitable means may be removed, thus leaving the tube exactly full so that the starting head or pressure for the different samples can always be made the same.

The bath is preferably filled with paraffin oil or other suitable fluid which does not evaporate readily and the vessel is covered by a turn-table 18 provided with a central opening through which the enlarged upper end 16 of the tube 14 projects. The turn-table 18 is preferably provided with two laterally projecting wooden handles 19 secured to the top in any suitable manner as by the T-shaped tubular sockets 20 which in the present instance are adapted to receive or permit the insertion therethrough of thermometers into the interior of the bath. Just below these handles, in the present instance, on each side of the turn-table and depending from the underside thereof, I have provided paddles 21 adapted for agitating the fluid of the bath when the turn-table is oscillated by means of the handles 19. The lower ends of paddles 21 are preferably secured together by a tubular boxing or pocket 22 adapted to receive and support the lower ends of the thermometers 23 substantially as indicated in Fig. 1 of the drawings. The turn-table 18 is further provided with perforations through which a tube 24 is adapted to pass, which in the present instance, is shown as U-shaped, but it will be understood that it may be of any desired shape in order to properly conduct through the bath fluid, steam, hot or cold water. The ends of the tube 24 are secured to the turn-table 18 in any suitable manner but preferably by elbow joints 25 each of which is provided with a tubular extension adapted to be connected with the steam or water pipes as required.

The turn-table 18 is preferably provided with an additional opening which is fitted with a tubular socket or thimble 26 which is adapted to receive or support an electric heating device 27 of the usual or any preferred type. The sides of the depending thimble 26 are perforated so that the electric heating element may come into contact with the fluid of the bath when the same is used to control the temperature. An additional hole or perforation 28 is provided in the turn-table cover, to permit filling or regulating the quantity of fluid in the bath without removing the turn-table. Suitable downwardly projecting lugs 29 are arranged about the underside of the turn-table cover and serve to center the same on the bath, some of these flanges being extended radially inward to serve as an attaching support for the paddles 21. Below the instrument a wooden base 30 is provided which preferably is fitted with a central opening 31 adapted to center the flask 32 below the nozzle 15 of the test sample tube 14. After a test has been made it is desirable that the tube shall be readily and thoroughly cleaned and prepared for the next sample and for this purpose I provide a piston 33 having a handle or rod 34 by which means the operator is enabled to quickly clean the tube and force out any remaining oil or liquid.

My apparatus may be used as follows: Set up the instrument on a suitable bench or table properly leveling the same, if required and see that the base ring 30 is in place so that a flask like 32 may be properly centered. The bath vessel is then filled with a suitable oil as for instance, pale engine oil of about 350° to 400° F. flash, being careful not to fill the vessel so full that when the cover is in place, it would overflow. The turn-table cover 18 is then placed in position and the thermometers inserted in the tubes 20 and supported upon the lower ends by the tubular pocket 22. Then the gas burner is lighted or steam is introduced into the U-tube 24 or, if desired, the electric heater 27 is inserted in the thimble or pocket 26 and the bath is brought to the temperature required. The oil or other liquid, whose viscosity it is desired to determine is then strained and carefully poured into the test sample tube 14, after the same has been cleaned, by using the plunger 33. Before pouring the oil to be tested into the tube 14 the stopper 13 is carefully inserted in the lower end of the tube 10 thereby forming an air cushion stopper for the lower end of the small tube in the nozzle 11, so that when the oil is poured into the tube 14 it will be effectually prevented from flowing therefrom by means of the air confined in the chamber. The cork stopper inserted in the end of the tube should not be long enough to reach or contact with the lower end of the nozzle 15 since this might injure the tip end of the nozzle or interfere with the proper flow of the sample during the timing of the test. When the oil to be tested is poured into the tube 14 it is not necessary to be over-careful in filling it exactly full for the overflow will be taken care of in the enlargement 16 and by means of a syringe, pipette or other device the excess oil may be removed before removing the stopper and the tube left exactly full thus obtaining the same head for each sample. The heating or regulating and agitating of the bath fluid may then continue and the thermometers read until the temperature desired is obtained, the turn-table being oscillated meanwhile by means of the handles 19 so that the paddles by agitating the fluid, distribute the heat therein uniformly. When the desired temperature is reached, the thermometer T is withdrawn and the surplus liquid removed from the cup 16 and then the stopper 15 is withdrawn quickly by pulling on the string attached thereto and the oil or other fluid being tested, contained in the tube 14, is permitted to issue in a small jet through the nozzle 15 and is adapted to fall into the flask 32 placed in the central opening in the base block, as previously explained. The flask should be graduated or the capacity thereof previously determined. In the instrument shown the flask is preferably of 60 c. c. capacity up to the mark indicated thereon. At the moment the cork 13 is withdrawn a stop watch is started and the time required for the oil or other liquid to flow into the flask until it is filled to the 60 c. c. mark gives the viscosity of the fluid tested. The comparative viscosity of several oils or liquids may thus be rapidly and accurately ascertained and the viscosity as compared with water may be found in the usual way; for instance, by dividing the viscosity (in seconds) by 30, the viscosity as compared with water at 15° C. will be obtained.

In operating my apparatus it will readily been seen that by providing the several heating appliances the operator may, by using all or one or more thereof, quickly obtain the temperature required for the bath and thus facilitate the tests. In some cases it may be desirable to use steam, which, as previously indicated, may be passed through the U-tube 24; and in case the temperature is too high, it will readily be understood that suitable connections with cold water pipes may be made with the U-tube 24 so that cold water may be passed therethrough in order to reduce the temperature of the bath when desired. The cooled bath may be necessary in testing the viscosity of certain liquids, which are thin and require low temperatures to give satisfactory results. With other liquids the use of hot water in the tube 24 may sufficiently heat the bath to give the temperature required. As before stated in some cases it may be necessary to use all of the appliances in order to quickly bring the bath to the required temperature although under ordinary conditions probably one will be sufficient.

It is sometimes desirable to make certain viscosity tests under constant head and for this purpose I have shown in Fig. 6 an apparatus provided with means for maintaining the liquid in the test sample tube at a constant level. For this purpose a reservoir 101 is filled with the same liquid as fills the test sample tube 14. The reservoir is provided with a central outlet opening in the neck 102, the mouth of which is adapted to be on a level with the top of the tube 14, the reservoir being supported in this position by suitable legs 103 which rest upon the bottom of the overflow cup 16. In order to permit the oil to flow freely from the opening 102 without giving place to entering air, a separate air tube 104 is provided. The lower end of the air inlet tube 104 is on the same level as the mouth of 102 and when the test-sample tube 14 is full both will be sealed. It will be seen however, that as soon as the level of the liquid in 14 gets below the ends of the tubes, liquid will flow from the reservoir and maintain a constant head during the test. It is sometimes preferable to weigh the test quantity of liquid instead of measuring it, and, if desired, a vessel 105, placed on a suitable scale or balance 106, may be used as indicated in Fig. 6.

Various modifications in the specific forms shown may be made without departing from the spirit of my invention.

I claim:

1. In a viscosimeter the combination of a tube for holding liquid the viscosity of which it is desired to ascertain, a bath surrounding the same, means for maintaining the bath at any desired temperature, a turn-table cover for said bath and means connected therewith for agitating the fluid of the bath.

2. In a viscosimeter the combination of a tube for holding liquid the viscosity of which it is desired to ascertain, a bath surrounding the same, means for maintaining the bath at any desired temperature, a turn-table cover for said bath and means depending from said turn-table adapted to support a thermometer within the bath.

3. In a viscosimeter the combination of a tube for holding liquid, the viscosity of which it is desired to ascertain, said tube having a constricted lower portion having an outlet or nozzle of fine bore, a tube surrounding said nozzle adapted when closed to form an air tight chamber, a bath concentrically arranged about said tubes, a turn-table cover therefor, means depending from said turn-table for agitating the bath fluid and means for oscillating said turn-table and agitating means.

4. In a viscosimeter the combination of a tube for holding liquid, the viscosity of which is desired to ascertain, a bath concentrically arranged about said tube and supporting the same, a turn-table cover for said bath provided with a hole through which the upper end of said tube projects, paddles extending into said bath for agitating the bath fluid and means extending outside the bath for oscillating said paddles.

5. In a viscosimeter the combination of a tube for holding liquid, the viscosity of which it is desired to ascertain, the upper end of said tube being provided with an overflow enlargement permitting uniform filling of the tube, a nozzle on the lower end of said tube, a tubular casing surrounding said nozzle and adapted to be closed to form an air seal for the nozzle and means for centering a flask under said nozzle to receive the discharge therefrom.

6. In a viscosimeter the combination of a tube for holding liquid, the viscosity of which it is desired to ascertain, a bath concentrically arranged about said tube, a turn-table cover for said bath, means suspended therefrom adapted to control the temperature of the bath fluid and means connected with said turn-table for agitating the bath fluid.

7. In an article of manufacture a viscosimeter provided with a tube for holding liquid, the viscosity of which it is desired to ascertain, a bath concentrically arranged about said tube and provided with a central opening in the bottom, means for securing the tube central of said opening, a jacket surrounding said bath provided with legs adapted to support the instrument and a base plate between the legs adapted to position a flask below the opening in said tube and bath.

8. In an article of manufacture a viscosimeter provided with a tube for holding liquid, the viscosity of which it is desired to ascertain, a bath surrounding said tube and adapted to support the same, a turn-table cover for said bath adapted to be oscillated, said turn-table serving as a support for means for controlling the temperature of the bath fluid, means for supporting thermometers within the bath, means for agitating the fluid of the bath and means exterior of the bath for oscillating said turn-table.

9. In an article of manufacture a vicosimeter comprising a tripod stand supporting a jacket, a bath supported by and spaced from said jacket, a circular gas burner within said jacket and below said bath, a tube for holding liquid, the viscosity of which it is desired to ascertain, arranged axially within said bath and supported thereby, means extending from said tube through the bottom of said bath for forming an air closure for said tube, a perforated turn-table cover for said bath said tube extending through the central perforation thereof, said turn-table being adapted to support means for controlling the temperature of the bath fluid, thermometers for ascertaining the temperature paddles for agitating the bath fluid and handles for oscillating said turn-table as desired.

In testimony whereof, I have hereunto set my hand in the presence of two subscribing witnesses.

GEORGE M. SAYBOLT.

Witnesses:
M. H. LOCKWOOD,
FRED A. KLEIN.